Nov. 2, 1954     G. H. FOCHT     2,693,139
REVOLVING DISK MOLDBOARD PLOW
Filed June 21, 1950

INVENTOR.
GEORGE H. FOCHT.
BY Dybvig & Dybvig
HIS ATTORNEYS.

United States Patent Office 2,693,139
Patented Nov. 2, 1954

2,693,139
REVOLVING DISK MOLDBOARD PLOW

George H. Focht, Germantown, Ohio

Application June 21, 1950, Serial No. 169,491

2 Claims. (Cl. 97—34)

This invention relates to a revolving disc moldboard type of plow and more particularly to a plow in which the forward edge of the revolving disc moves upwardly.

It is recognized that a large number of different types of rotary disc plows have been devised from time to time and it is further recognized that I am not the first to drivingly connect a revolving disc to the power take-off on a tractor. My invention, however, represents an improvement over disc plows of the type shown in such patents as Hill Patent No. 2,490,688 and Martin Patent No. 955,179. Some of the prior disc plows have been satisfactory for limited uses but have been unsatisfactory for many uses because they have lacked the plowshare, others have failed to operate properly because the moldboards were caused to operate in the wrong direction to properly turn over the soil, and still others have been unsatisfactory for other reasons.

It is an object of this invention to provide a disc plow which will not clog up in soft or mushy ground.

Another object of this invention is to provide a tractor operated disc plow which is designed to relieve the drawbar pull.

More particularly, it is an object of this invention to provide a plow in which the moldboard is in the form of a revolving disc drivingly connected to the power take-off on the tractor in such a manner that the front edge of the disc moves upwardly adjacent the front end of the plowshare.

Another object of this invention is to provide a disc plow wherein the upper rear edge of the moldboard serves as a scraper for the revolving disc.

Other objects and advantages reside in the construction of parts, the combination thereof and the mode of operation, as will become more apparent from the following description.

Figure 1:
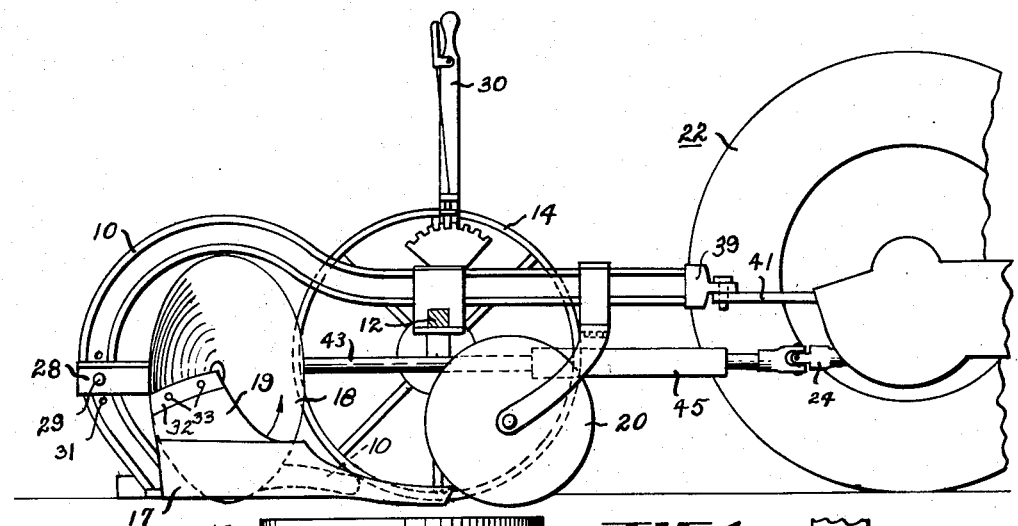
Figure 1 is a fragmentary side elevational view showing a preferred embodiment of my invention.

In the drawing, reference numeral 10 designates a plow beam carried on the crossbar member 12 which is supported by the ground wheels 14 and 15 in accordance with standard practice. A plowshare 17 is removably supported on the lower end of the beam 10 and is arranged to make the bottom cut of the furrow being formed by the plowing operation. The width of the furrow will, of course, depend upon the size of the plowshare 17 in accordance with well-known practice. In lieu of using the conventional form of moldboard for turning over the earth, I have provided a modified type of moldboard 19 which is much smaller than the conventional moldboard and which cooperates with a revolving disc 18 to turn over the soil in a manner to be explained more fully hereinafter.

The edge of the furrow is cut by means of a conventional colter 20 which is pivotally supported from the beam 10 in accordance with standard practice. Reference numeral 22 designates a conventional tractor for use in pulling the plow. The tractor 22 is provided with a power take-off 24 which is adapted to be drivingly connected to suitable gearing mechanism 26 for the revolving disc moldboard 18. The mechanism for driving the revolving disc moldboard 18 is arranged so that the front edge of the disc travels upwardly so as to pick up the earth sheared off by the plowshare and to throw it over as the plow moves forward. The faster the moldboard revolves, the farther it will throw the earth and the finer it will break it up. By shifting gears on the tractor, it is possible to vary the relationship between the speed of rotation of the revolving moldboard 18 and forward speed of the plow. Furthermore, if the wheels of the tractor start slipping due to a heavy drawbar pull, then the moldboard 18 will continue to rotate. The disc is supported on the beam 10 by means of the support 28 which may be adjusted relative to the plowshare by any suitable means, such as by changing the bolt 29 in the holes 31 provided in the beam 10 so as to set the disc at different heights.

The beam 10 and the elements carried thereby may be raised and lowered by means of any suitable mechanism, either manual or automatic. In order to simplify this disclosure, I have shown a conventional hand lever 30 for use in raising and lowering the beam 10, in accordance with well-known practice. In many types of plows, hydraulic means woud be used for raising and lowering the plowshare.

Figure 2:
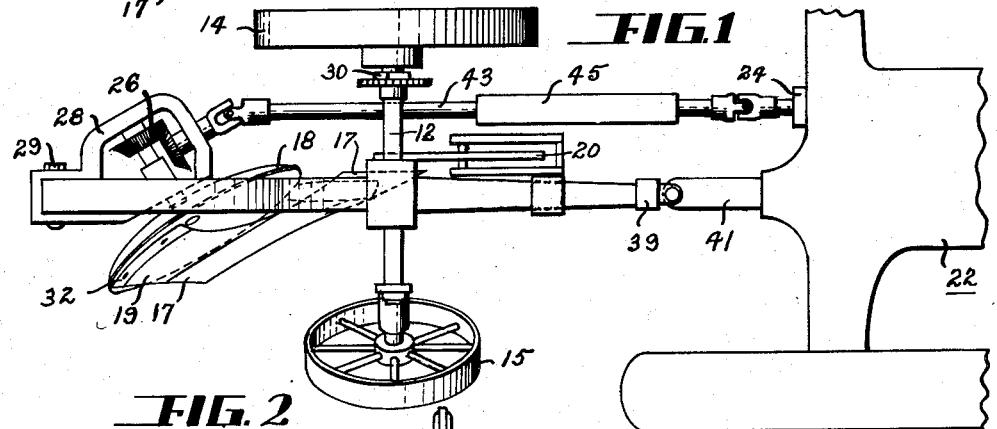
Figure 2 is a plan view of the mechanism shown in Figure 1.
Figure 3:
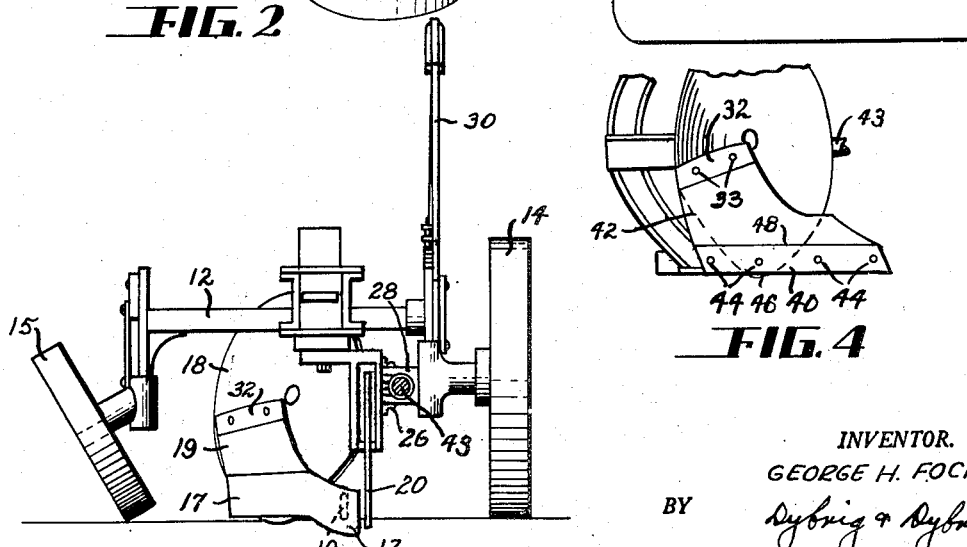
Figure 3 is a rear end view of the plow per se.

Referring now to Figures 1 and 2 of the drawing, it will be observed that a scraper element 32, which is removably secured to the moldboard 19 by means of bolts 33, has been provided for scraping the trailing edge of the disc, so as to prevent the accumulation of dirt on the revolving disc 18. The scraper 32 may, if desired, be formed integral with the plowshare 17 or may be formed as a separate replaceable element somewhat resembling a partial moldboard. In Figures 1, 2 and 3 of the drawing, the scraper 32 and the member 19 have been shown as separate from the plowshare.

A suitable hitch 39 has been provided for attaching the beam 10 to the drawbar 41 of the tractor 22. Power may be transmitted from the power take-off 24 to the gearing mechanism 26 in any suitable manner, such as by the connecting rod 43 which for purposes of illustration has been shown in two sections connected together by means of the splined sleeve 45, so as to allow for variations in the distance between the power take-off 24 and the gearing mechanism 26 when the tractor makes turns. The particular type of mechanism used for transmitting power from the power take-off to the revolving moldboard may be varied without departing from the spirit of my invention and consequently the particular mechanism shown will not be described in greater detail.

For purpose of illustration I have shown a plow of the type carried on wheels, whereas certain aspects of the invention are equally applicable to plows of the type which are carried directly by the tractor.

Figure 4:
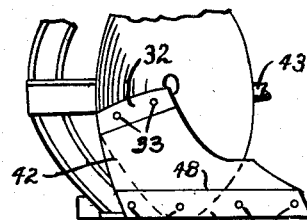
Figure 4 is an elevational view of a modified type of moldboard and plowshare for use on the plow shown in Figures 1 and 3.

Figure 4 of the drawing shows a modified plowshare arrangement wherein a replaceable narrow shear blade or point 40 has been provided at the lower edge of the fragmentary moldboard 42. The shear blade or point 40 has both its lower edge 46 and its upper edge 48 sharpened, so that when the lower edge 46 becomes dull, the blade can be inverted and the edge 48 can be used for cutting the furrow. This blade 40 is held in place by means of bolts or screws 44 which are centrally located so that the blade 40 can readily be inverted. The ends of the blade are parallel to one another and are arranged at an angle to the longer sides, as shown, so that irrespective of which edge of the blade is placed downwardly, the ends will be arranged as shown in Figure 4. By virtue of this construction and arrangement, each blade will last twice as long as the average blade. Furthermore, the cost of the blade is sufficiently low that when both edges of the blade are dull, the blade can be throw away and replaced by a new blade.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a soil engaging apparatus, the combination comprising a beam, a plow carried by the beam, the plow provided with a moldboard having a substantial part of its leading portion cut away, a revolving disc moldboard supported closely adjacent the rearward side of the plow, the forward section of the revolving disc moldboard being disposed at the cut away section of the plow moldboard, and means for rotating the disc in such a direction that its forward section moves upwardly.

2. The combination defined in claim 1 in which the plow moldboard carries a scraper portion cooperating with the disc moldboard at the downward moving trailing section thereof.

References Cited in the file of this patent

UNITED STATES PATENTS

| Number | Name | Date |
|---|---|---|
| 489,015 | Kirk | Jan. 3, 1893 |
| 731,179 | Harrison et al. | June 16, 1903 |
| 1,621,772 | Ellenburg | Mar. 22, 1927 |
| 1,827,170 | Rust | Oct. 13, 1931 |
| 1,851,862 | Nelson | Mar. 29, 1932 |
| 1,858,697 | Wise | May 17, 1932 |
| 1,892,485 | Dufour | Dec. 27, 1932 |
| 2,063,584 | Collins | Dec. 8, 1936 |
| 2,542,474 | Burchett | Feb. 20, 1951 |